(12) United States Patent
Oikubo

(10) Patent No.: US 7,127,350 B2
(45) Date of Patent: Oct. 24, 2006

(54) NAVIGATION APPARATUS

(75) Inventor: Wataru Oikubo, Kanagawa (JP)

(73) Assignee: Xanavi Informatics Corporation, Zama (JP)

( * ) Notice: Subject to any disclaimer, the term of this patent is extended or adjusted under 35 U.S.C. 154(b) by 101 days.

(21) Appl. No.: 10/846,928

(22) Filed: May 17, 2004

(65) Prior Publication Data
US 2005/0149262 A1 Jul. 7, 2005

(30) Foreign Application Priority Data
May 16, 2003 (JP) ............... 2003-139286

(51) Int. Cl.
G01C 21/34 (2006.01)
(52) U.S. Cl. ................... 701/211; 340/995.2
(58) Field of Classification Search ............ None
See application file for complete search history.

(56) References Cited
U.S. PATENT DOCUMENTS
5,739,772 A * 4/1998 Nanba et al. ............ 340/990
6,269,304 B1 * 7/2001 Kaji et al. ............... 701/209
6,446,000 B1 * 9/2002 Shimabara .............. 701/209
6,804,603 B1 * 10/2004 Ukita .................... 701/200

FOREIGN PATENT DOCUMENTS
JP 2000-251197 9/2000

* cited by examiner

Primary Examiner—Michael J. Zanelli
(74) Attorney, Agent, or Firm—Crowell & Moring LLP

(57) ABSTRACT

A navigation apparatus includes: a route search unit that obtains a route to take from a start point to a destination; a vehicle position detection unit that detects a vehicle position; and a route guidance unit that provides route guidance based upon the obtained route. And the route guidance unit displays the route within a predetermined range from the vehicle position as a straight bar together with the vehicle position, displays an intersection indicator on the straight bar in correspondence to an intersection present within the predetermined range on the route and varies display mode when displaying the intersection indicator depending upon whether the intersection is a guidance-requiring intersection at which the route guidance is provided or a non-guidance intersection at which the route guidance is not provided.

19 Claims, 12 Drawing Sheets

FIG.5

|  | WITH LANE INFORMATION | WITHOUT LANE INFORMATION |
|---|---|---|
| GUIDANCE-REQUIRING INTERSECTION | BLUE | PINK |
| NON-GUIDANCE INTERSECTION | GRAY | NO DISPLAY (OR GRAY) |

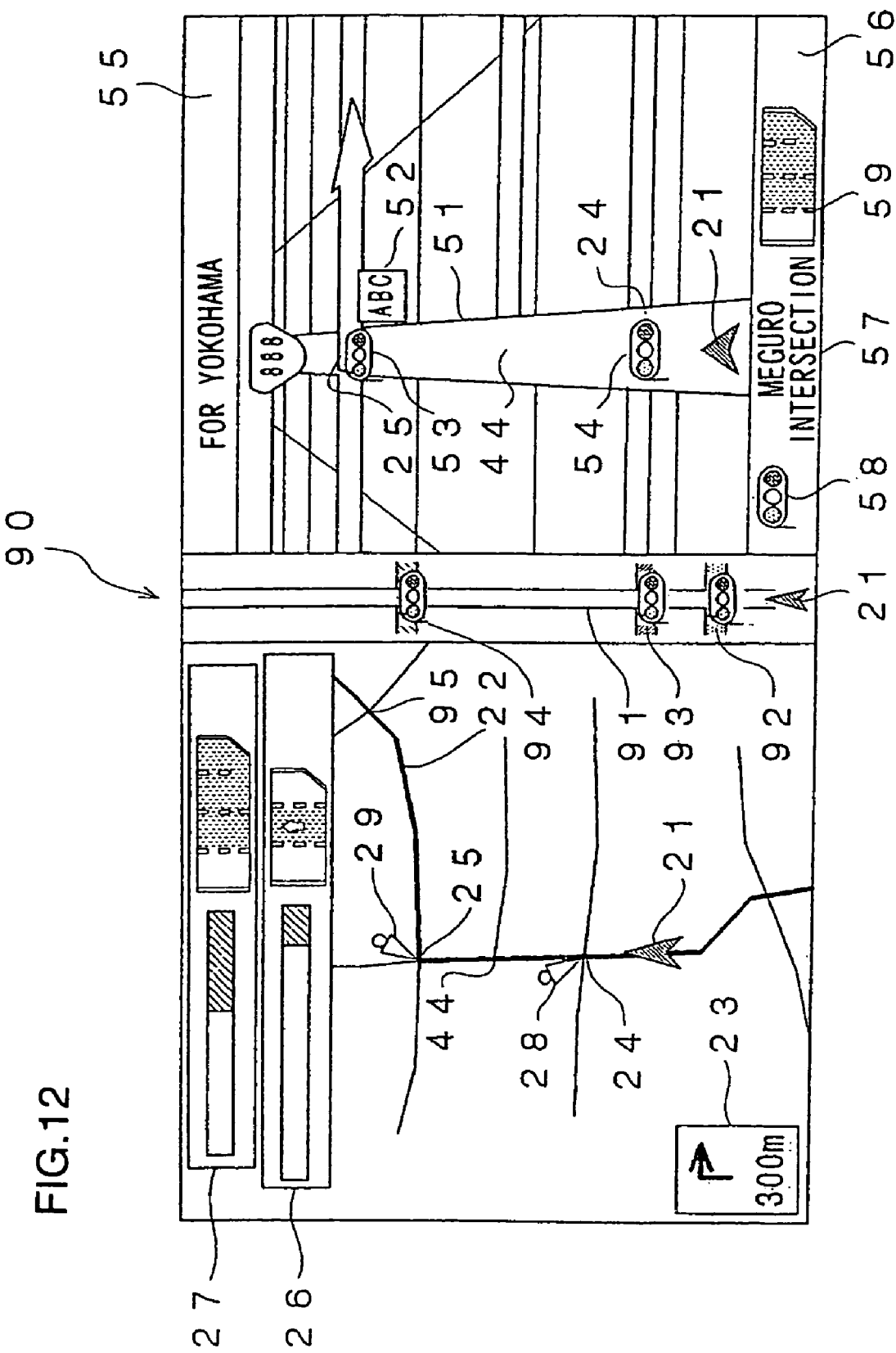

NAVIGATION APPARATUS

INCORPORATION BY REFERENCE

The disclosure of the following priority application is herein incorporated by reference:
Japanese Patent Application No. 2003-139286 filed May 16 2003

BACKGROUND OF THE INVENTION

1. Field of the Invention

The present invention relates to a navigation apparatus that provides route guidance.

2. Description of the Related Art

There are car navigation apparatuses known in the related art that display a roadmap around the current position, calculate a route to take from a start point to a destination and provide route guidance based upon the calculated route. In such a car navigation apparatus in the known art, the route obtained through a route search is displayed on the map distinguishably from other roads. In addition, it is known in the related art that if there is any lane information available with regard to a guidance-requiring intersection at which route guidance is necessary provided as the vehicle approaches the area, the lane information is also displayed (see, for instance, Japanese Laid Open Patent Publication No. H 2000-251197).

SUMMARY OF THE INVENTION

The navigation apparatus in the related art described above, which displays the route on a map, allows the user to ascertain the route accurately. However, the user may wish to quickly obtain information with regard to an intersection on the route without having to visually trace the route on the map. In addition, the user may only wish to know whether or not there is any lane information pertaining to a specific intersection.

The present invention provides a navigation apparatus that allows the user to easily obtain intersection information with regard to an intersection on the route by providing the intersection information in a simple display.

A navigation apparatus according to the present invention comprises: a route search unit that obtains a route to take from a start point to a destination; a vehicle position detection unit that detects a vehicle position; and a route guidance unit that provides route guidance based upon the obtained route. And the route guidance unit displays the route within a predetermined range from the vehicle position as a straight bar together with the vehicle position, displays an intersection indicator on the straight bar in correspondence to an intersection present within the predetermined range on the route and varies display mode when displaying the intersection indicator depending upon whether the intersection is a guidance-requiring intersection at which the route guidance is provided or a non-guidance intersection at which the route guidance is not provided.

Another navigation apparatus according to the present invention comprises: a route search unit that determines a route to take from a start point to a destination; a vehicle position detection unit that detects a vehicle position; and a route guidance unit that provides route guidance based upon the obtained route. And the route guidance unit displays the route within a predetermined range from the vehicle position as a straight bar together with the vehicle position, displays an intersection indicator on the straight bar in correspondence to an intersection present within the predetermined range on the route and varies display mode when displaying the intersection indicator depending upon whether or not there is lane information to be guided at the intersection.

In the above navigation apparatuses, it is preferred that the route guidance unit displays the intersection indicator so as to enable a user to determine whether or not traffic lights are present at the intersection.

Also, it is preferred that the route guidance unit displays the vehicle position on the straight bar at a fixed position and shifts the intersection indicator as the vehicle moves.

Also, it is preferred that the route guidance unit varies the display mode by changing a color used to display the intersection indicator.

Also, it is preferred that the route guidance unit displays the intersection indicator on the straight bar at a position set in proportion to a distance from the vehicle position to the intersection.

Also, it is preferred that the route guidance unit displays information related to lane corresponding to the intersection. In this case, it is preferred that the route guidance unit displays the intersection indicator on the straight bar and the information related to lane with specific correlated indication regarding an intersection.

A computer-readable computer program product according to the present invention comprises a control program that executes functions of any one of the above navigation apparatuses.

BRIEF DESCRIPTION OF THE DRAWINGS

FIG. 5 presents a chart of different display colors that are selectively used depending upon whether a given intersection is a guidance-requiring intersection or a non-guidance intersection and whether or not there is any lane information pertaining to the intersection;

FIG. 12 shows an example in which traffic light marks are displayed in the route bar.

DESCRIPTION OF THE PREFERRED EMBODIMENTS

First Embodiment

Figure 1:
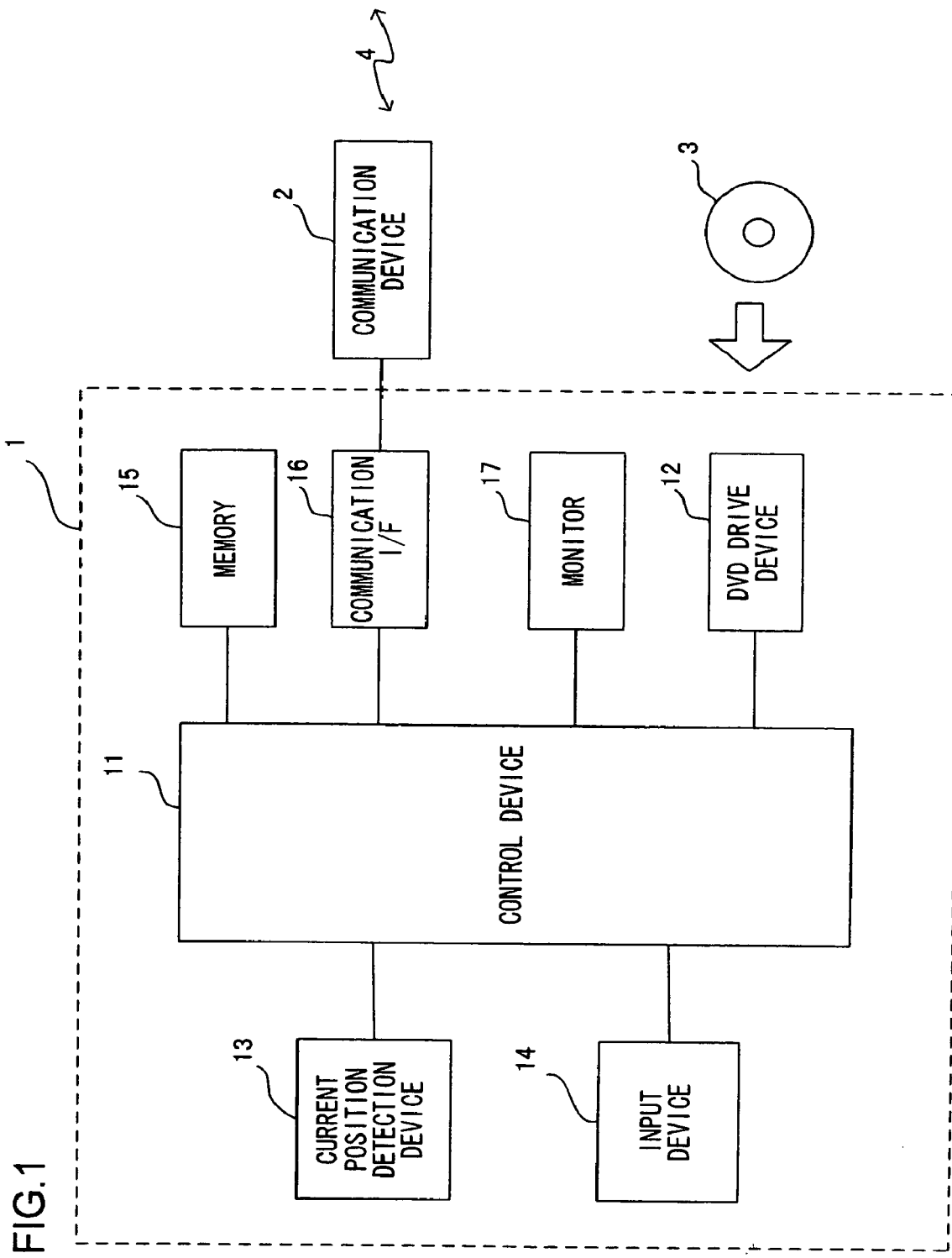
FIG. 1 is a block diagram of the navigation apparatus achieved in an embodiment of the present invention.

FIG. 1 is a block diagram of an on-vehicle navigation apparatus (hereafter simply referred to as a navigation apparatus) 1 achieved in the embodiment. The navigation apparatus 1 comprises a control device 11, a DVD drive device 12, a current position detection device 13, an input device 14, a memory 15, a communication interface 16 and a monitor 17.

The control device 11 is constituted with a microprocessor and its peripheral circuits. The DVD drive device 12 reads map data and the like from a recording medium 3 loaded therein. The recording medium 3 is a DVD having stored therein map data and the like. However, the recording medium 3 may be another type of medium such as a CD-ROM.

The current position detection device 13, which detects the current position of the vehicle, is constituted with, for instance, an azimuth sensor that detects the advancing azimuth of the vehicle, a vehicle speed sensor that detects the vehicle speed, a GPS sensor that detects a GPS signal from a GPS (Global Positioning System) satellite and the like. The input device 14 is used to enter the destination of the vehicle and the like when executing a route search. It may be constituted of a remote controller or it may instead be constituted of a touch panel or the like provided on the screen at the monitor 17.

The memory 15, in which vehicle position information detected by the current position detection device 13 and the like are stored, also stores therein node information, link information and the like on a recommended route calculated by the control device 11, and constitutes a working area of the control device 11. A communication device 2 is connected to the communication interface 16. The use of a portable telephone and a connection with the Internet 4 are enabled via the communication interface 16. The monitor 17 is a display device at which various types of information including maps and recommended routes are displayed. The monitor 17 may be provided as an integrated part of the navigation apparatus main unit, or it may be provided in a separate casing. In addition, the monitor 17 may be installed alone at a separate position and be connected to the navigation apparatus main unit through a cable or the like.

The control device 11 executes various types of navigation processing such as road map display, route search (route calculation) and route guidance by using the current vehicle position information detected by the current position detection device 13 and the map data and the like read from the recording medium 3 via the DVD drive device 12. It is to be noted that programs for the various types of processing executed by the control device 11 are installed in a ROM (not shown) in the control device 11.

The map data stored in the recording medium 3 constitute information related to maps, and are classified into map display data, route guidance data, route search data and the like. The map display data are further classified into road data, background data and name data. The road data are used for road display, current vehicle position specification, map matching and the like. The background data are used to display backgrounds of roads and backgrounds in road maps. The name data, which are constituted of geographical names, building names and the like, are used when displaying road maps.

The route guidance data, constituted of information indicating intersection names, road names, road signs (directions, etc.), and are used when providing the user or the like with guidance along the recommended route having been calculated. The route guidance data further include lane information corresponding to individual intersections. The route search data are network data constituted of branch information and the like bearing no direct relevance to the actual shapes of the roads and are mainly used when calculating recommended routes (in route searches).

The navigation apparatus 1 in this embodiment brings up a lane indicator display by using lane information corresponding to the individual intersections during the route guidance.

Figure 2:
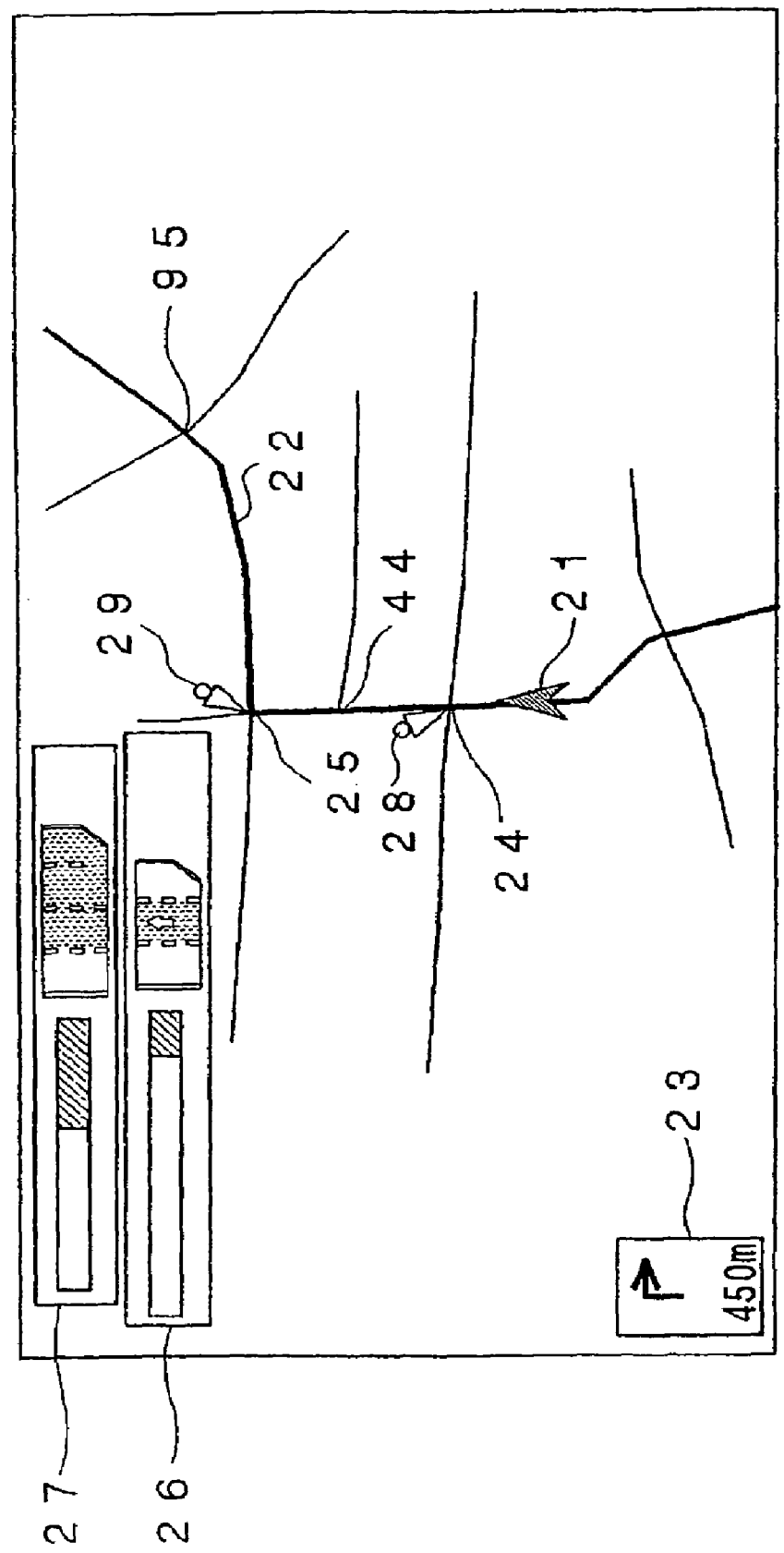
FIG. 2 shows a single screen display provided to facilitate an explanation of a lane indicator display.
Figure 3:
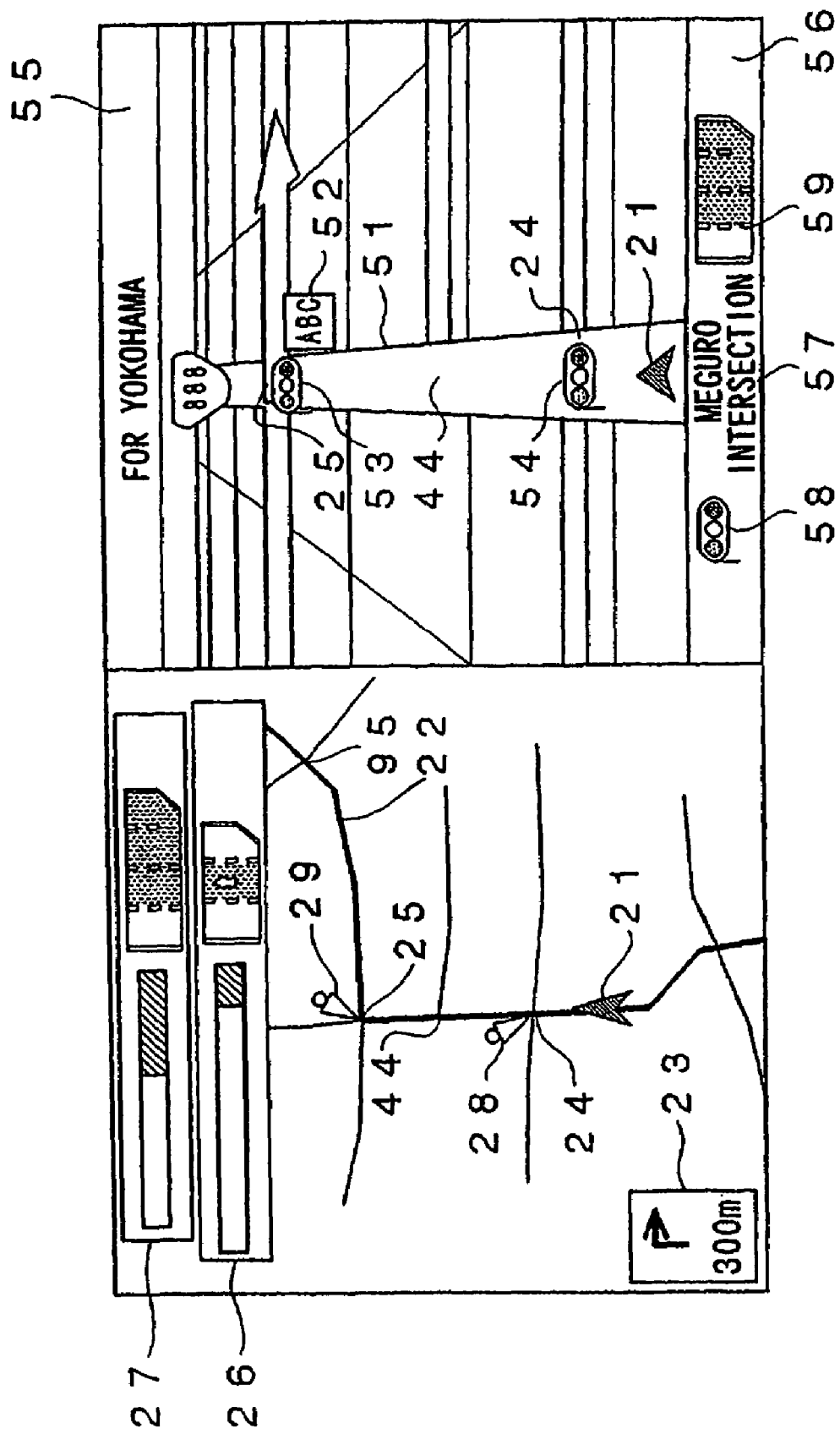
FIG. 3 shows a dual screen display provided to facilitate an explanation of the lane indicator display.

FIGS. 2 and 3 illustrate the lane indicators adopted in the embodiment. FIG. 2 shows a single screen display in which a planimetric map is displayed over the entire monitor 17. FIG. 3 shows a dual screen display in which the planimetric map and an enlarged map of an area containing intersections are displayed. The planimetric map in FIGS. 2 and 3, which is displayed at a predetermined scaling factor, includes a current position mark 21 indicating the current position of the vehicle (which may be hereafter referred to as a current vehicle position 21 or simply as a current position 21) and a route 22. The route 22 is displayed in a different color from that used to indicate other roads on the map or with a bolder line.

An intersection at which route guidance should be provided is referred to as a guidance-requiring intersection, whereas an intersection at which no route guidance is provided in is referred to as a non-guidance intersection. A guidance-requiring intersection is an intersection at which the vehicle needs to turn right or left, and the vehicle advances straight ahead through a non-guidance intersection. A right/left turn as referred to in this context may not always mean that the vehicle makes a 90° turn. Instead, the vehicle may make a diagonal turn or may turn into a side road from a main road. In addition, the term "guidance-requiring intersection" may refer to an intersection at which route guidance other than route guidance for a right/left turn is provided. For instance, lane change instructions may be provided at a guidance-requiring intersection. At a non-guidance intersection, on the other hand, no route guidance whatsoever is provided. The route guidance may be provided in the form of audio instructions as well as visual guidance brought up on display.

While the vehicle is traveling under normal conditions before nearing a guidance-requiring intersection, the single screen display is up and once the vehicle approaches the guidance-requiring intersection, the display is switched to the dual screen display of the planimetric map and the enlarged map of the area containing the intersection. In the navigation apparatus 1 achieved in the embodiment, the dual screen display in FIG. 3 is brought up as the vehicle comes within 300 m of the guidance-requiring intersection. The single screen display in FIG. 2 indicates that the vehicle is currently 450 m from the guidance-requiring intersection. The distance to the guidance-requiring intersection is indicated by a guidance-requiring intersection mark 23. The guidance-requiring intersection mark 23 indicates the distance to the coming guidance-requiring intersection and the direction in which the turn is to be made, i.e., right or left. It is to be noted that the display settings may be freely modified so as to bring up the dual screen display while the vehicle is traveling under normal conditions, to sustain the single screen display even when the vehicle is approaching a guidance-requiring intersection or the like. The point at which the dual screen display is brought up may be set to a value other than 300 m. In addition, this setting may be adjusted by the user, as well.

In FIG. 2, lane indicators 26 and 27 with regard to the lanes at an intersection 24 and an intersection 25 respectively are displayed at the upper left of the screen. The lane indicators 26 and 27 are brought up to provide information of lanes if there is lane information with regard to a predetermined number of intersections (two intersections in the embodiment) within a predetermined range (500 m in the embodiment) from the current vehicle position. However, if there is only one intersection with lane information, only one lane indicator is brought up on display in correspondence to the single intersection. The predetermined distance and the predetermined number of intersections may be set to values other than 500 m and 2. In addition, the settings may be adjusted by the user.

The lane indicators 26 and 27 are brought up on display one above the other, with the lane indicator for the intersection closer to the current vehicle position displayed at the lower position. If there is no intersection with lane information within 500 m of the current vehicle position, no lane indicator is brought up on display. As the vehicle advances and a first intersection with lane information comes within the 500 m range, the lane indicator corresponding to the first intersection is brought up on display on the upper side. Then, as a second intersection enters the 500 m range, the lane indicator corresponding to the first intersection moves to the lower side and the lane indicator corresponding to the second intersection is brought up on the upper side.

After the vehicle has passed the first intersection, the lane indicator corresponding to the first intersection is cleared. At this time, if there are two or more intersections with lane information present within the 500 m range from the current vehicle position excluding the first intersection, the lane indicator for the second intersection is moved to the lower side and a lane indicator corresponding to a new third intersection is brought up on display on the upper side as the lane indicator for the first intersection is cleared.

By displaying the lane indicators 26 and 27 one above the other and shifting the lane indicators 26 and 27 as described above as the vehicle moves on, the user is assisted to picture how the intersections 24 and 25 lie ahead in succession with ease. This feature is particularly effective in a head-up map display.

In the planimetric map, the intersections with regard to which lane indicators are displayed are marked with guide pins 28 and 29. The guide pin 28 corresponds to the lane indicator 26, whereas the guide pin 29 corresponds to the lane indicator 27. These guide pins help the user ascertain at a glance for which intersections on the planimetric map the lane indicators are displayed.

Figure 4:
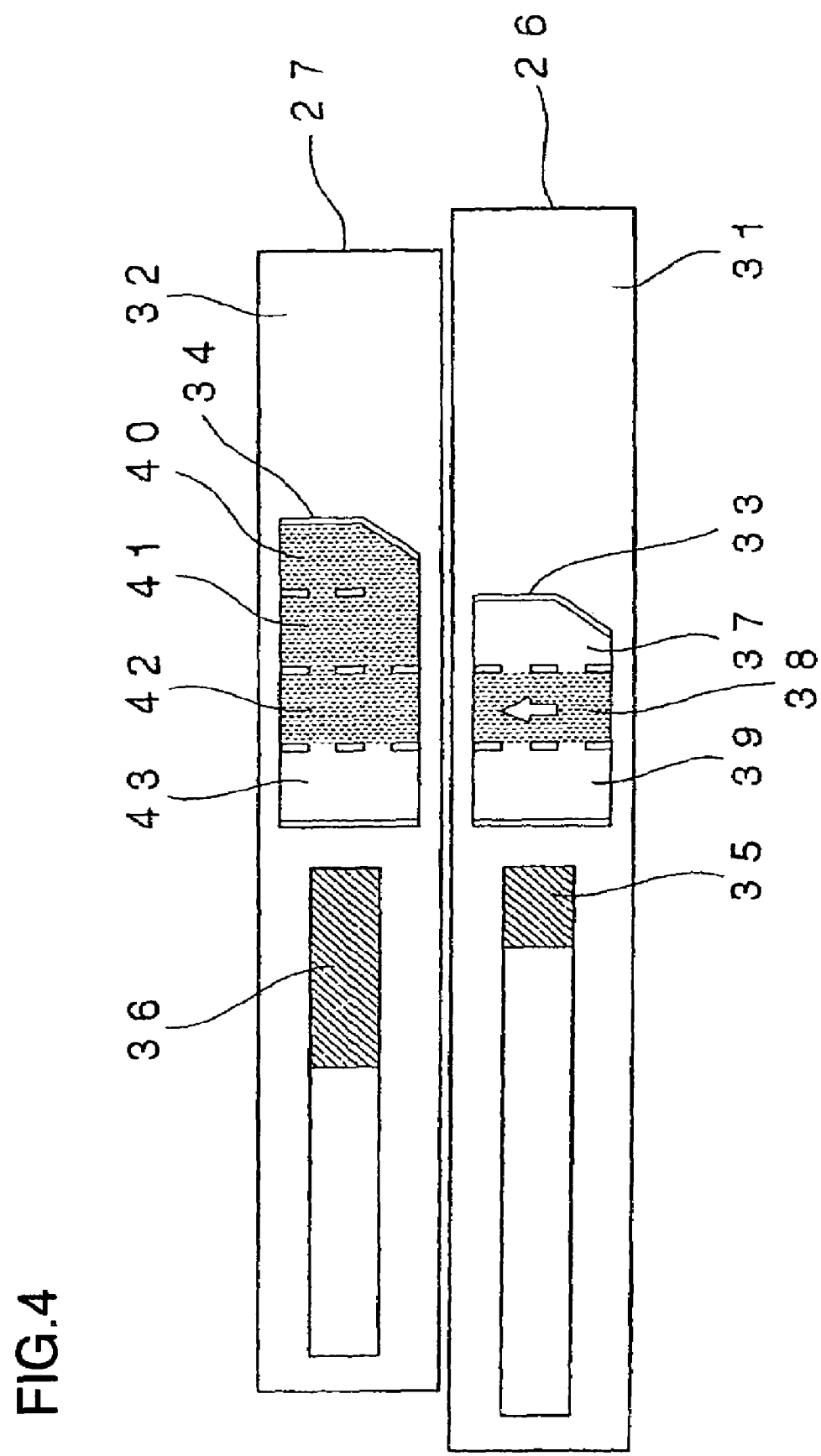
FIG. 4 shows lane indicators in an enlargement.

FIG. 4 shows the lane indicators 26 and 27 in an enlargement. The lane indicators 26 and 27 respectively include base displays 31 and 32, lane displays 33 and 34 and distance bars 35 and 36. Since the lane displays 33 and 34 and the distance bars 35 and 36 are respectively set over the base displays 31 and 32, the base displays 31 and 32 may be regarded as base mat displays.

In the embodiment, a given display color is selectively used to indicate a given type of intersection depending upon whether the intersection is a guidance-requiring intersection or a non-guidance intersection and also depending upon whether or not there is any lane information corresponding to the intersection, as indicated in the chart presented in FIG. 5. For instance, if blue is used as the display color, the intersection is a guidance-requiring intersection with lane information, if pink is used as the display color, the intersection is a guidance-requiring intersection with no lane information, if gray is used as the display color, the intersection is a non-guidance intersection with lane information and if no color is used for the display or if gray is used as the display color, the intersection is a non-guidance intersection with no lane information. The route 22 is displayed in pink.

The intersection 24 in FIG. 2 is a non-guidance intersection through which the vehicle is to advance straight ahead with no route guidance. However, lane information is available with regard to the intersection 24. The base display 31 in the lane indicator 26 corresponding to the intersection 24 is gray. A lane 37 is a right turn lane, a lane 38 is a through lane and a lane 39 is a left turn lane. Accordingly, the lane 38 alone is displayed in pink to indicate that it constitutes the guided route and the other lanes 37 and 39 are displayed in gray in the lane display 33. An arrow indicating straight ahead is also displayed over the lane 38. In other words, the lanes 37 and 39, as opposed to the lane 38 on which the vehicle should travel under guidance, are displayed in gray, indicating that the intersection is a non-guidance intersection with lane information. It is to be noted that the display of lane 37 shows the line stopping in the middle and has the lower corner missing; this indicates that lane 37 has been added to function as a right turn lane.

The distance bar 35 is displayed to visually indicate the distance from the current vehicle position 21 to the intersection 24 corresponding to the lane indicator 26. Since a lane indicator is brought up as the corresponding intersection enters within the 500 m range from the vehicle position, the entire length of the distance bar 35 corresponds to 500 m in the embodiment. The shaded portion at the right side of the distance bar 35 indicates the remaining distance to the intersection, which becomes shorter as the vehicle advances.

The intersection 25, on the other hand, is a guidance-requiring intersection with lane information. The base display 32 in the lane indicator 27 corresponding to the intersection 25 is blue. The vehicle is allowed to make a right turn through any of lanes 40 to 42, whereas it is only allowed to advance straight ahead or make a left turn and is not allowed to make a right turn on a lane 43. Accordingly, in the lane display 34, the lanes 40 to 42 are displayed in pink, indicating the guided route and lane 43 is displayed in blue. In other words, lane 43, as opposed to lanes 40 to 42 on one of which the vehicle should travel under guidance, is displayed in blue, indicating that the intersection is a guidance-requiring intersection with lane information.

The distance bar 36, which is similar to the distance bar 35, is displayed to visually indicate the distance from the current vehicle position 21 to the intersection 25 corresponding to the lane indicator 27. The user can visually ascertain the distances to the intersections 24 and 25 with ease by checking the corresponding distance bars 35 and 36 displayed as described above. In addition, since the distance bar 35 and the distance bar 36 are displayed one above the other, the user can easily ascertain whether the intersections 24 and 25 are located close to each other or far from each other.

By checking the color coding of the lane indicators 26 and 27 as described above, the user can quickly ascertain whether the intersection corresponding to either lane indicator is a guidance-requiring intersection or a non-guidance intersection and whether or not there is any lane information for the intersection. It is to be noted that if a given non-guidance intersection has lane information indicating that the vehicle can advance straight ahead on any of the lanes at the intersection, the lanes are all displayed in pink, indicating that any of the lanes can be taken as the guided route. Since the base display is gray in this case, too, the user can ascertain at a glance that the intersection is a non-guidance intersection. In addition, since any lane in which the vehicle can travel along the guided route is displayed in pink, as is the route 22, the user can visually ascertain at once that the lane is the correct lane to travel on.

Furthermore, since the guide pins 28 and 29, too, are displayed in gray and blue respectively in correspondence to the lane indicators 26 and 27, the correlations between the guide pins and the lane indicators can be ascertained with ease. Alternatively, guide pins in a plurality of colors may be used and guide pins in a single color may be displayed at a side of an intersection on the map and at a side of the corresponding lane indicator. These measures eliminate the need to display the guide pins in conformance to the color coding rules in the chart in FIG. 5. Consequently, when there are two similar intersections, e.g., when there are two non-guidance intersections with lane information (gray), the user can quickly match the intersections on the map with the corresponding lane indicators by distinguishing the guide pins displayed in different colors from each other.

No lane indicator brought up on display with regard to an intersection 44 in FIG. 2, since the intersection 44 is a non-guidance intersection with no lane information. There is no lane information with regard to the intersection 44 either because the actual road becomes a single lane road around the intersection 44 or because no lane information data are stored with regard to the intersection 44 although there is a plurality of lanes on the actual road.

Next, an explanation is given in reference to FIG. 3. FIG. 3 shows the dual screen display brought up when the current vehicle position has entered the 300 m range from a guidance-requiring intersection, as explained earlier. The map on the left side of the screen, similar to that in FIG. 2 described earlier, shows an area approximately half of the area shown in the map in FIG. 2 around the current vehicle position. Since the details of the lane indicators 26 and 27 are identical to those of the lane indicators 26 and 27 in FIG. 2, their explanation is omitted. On the right side of the screen, an enlarged map of an area around the intersection is specifically provided to facilitate the route guidance at the intersection 25. FIG. 3 includes a deformed and simplified display 51 (hereafter referred to as a route 51) of the route 22 in FIG. 2. The route 51 is displayed in pink, as is the route 22. Reference numeral 52 indicates a landmark which may be a convenience store, a gas station, a hamburger restaurant or the like. The landmark in the example is marked as an ABC convenience store. Since the traffic at both the intersection 25 and the intersection 24 is directed with traffic lights, traffic light marks 53 and 54 are displayed at the intersections 25 and 24 respectively.

On the upper side 55 of the screen, a direction display indicating the direction along which the vehicle is being guided is up, whereas the intersection name 57 of the guidance-requiring intersection is displayed on the lower side 56 of the screen. In addition, an indicator 58 indicating whether or not there are traffic lights at the intersection and a lane display 59 are brought up on display together with the intersection name 57. The lane display 59 is similar to the lane display in the lane indicator 27. The enlarged map of the area around the intersectionis a bird's-eye view of the intersection 25 at a position set above and behind the vehicle position showing the individual roads in a simplified form. In addition, grid lines becoming narrower as they move forward, too, are displayed to indicate that the map is a bird's-eye view perspective.

The display clearly indicates that the vehicle is to make a right turn at the second set of traffic lights from the current vehicle position 21, i.e., at the intersection at the right corner of which an ABC convenience store is located. A large arrow is displayed on the route 51 clearly indicating in which direction the vehicle should turn. In addition, the display indicates the general direction along which the vehicle is being guided and also the name of the specific guidance-requiring intersection. Furthermore, the user can obtain lane information for the intersection 25 simply by checking the lane display 59 in the enlarged map of the intersection area on the right side of the screen. The lane display 59 conforms to the same color coding rules as those adopted for the lane display 34 of the lane indicator 27.

Figure 6:
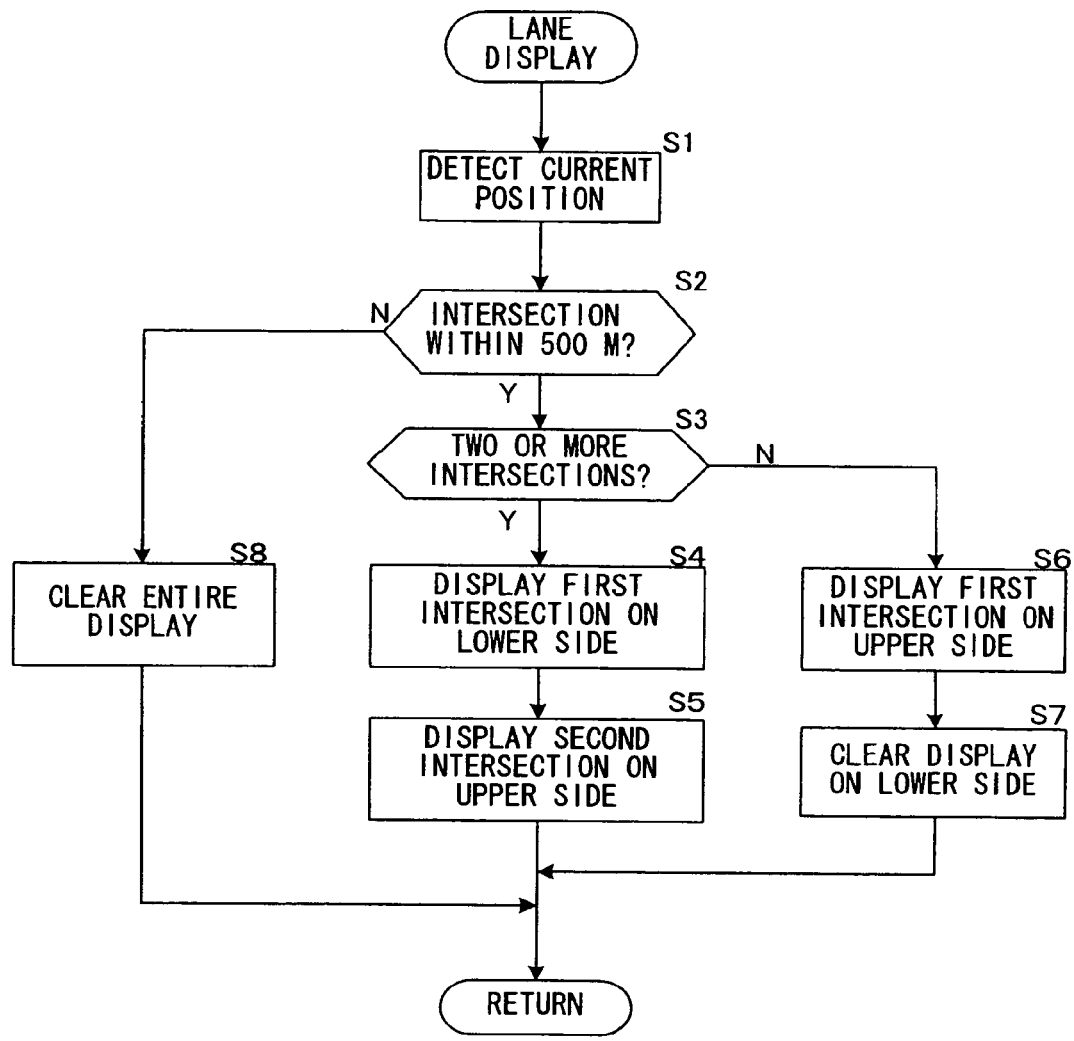
FIG. 6 presents a control flowchart related to the lane indicator display.

Next, an explanation is given in reference to the flowcharts of the control implemented in the embodiment. FIG. 6 presents a flowchart of the lane indicator display control. The control device 11 executes a control program stored in a ROM (not shown). This processing is executed repeatedly with predetermined timing In step S1, the current vehicle position is detected with the current position detection device 13. In step S2, a decision is made by referencing an intersection information table as to whether or not there is any intersection with lane information present within the 500 m range from the current position.

Figure 7:
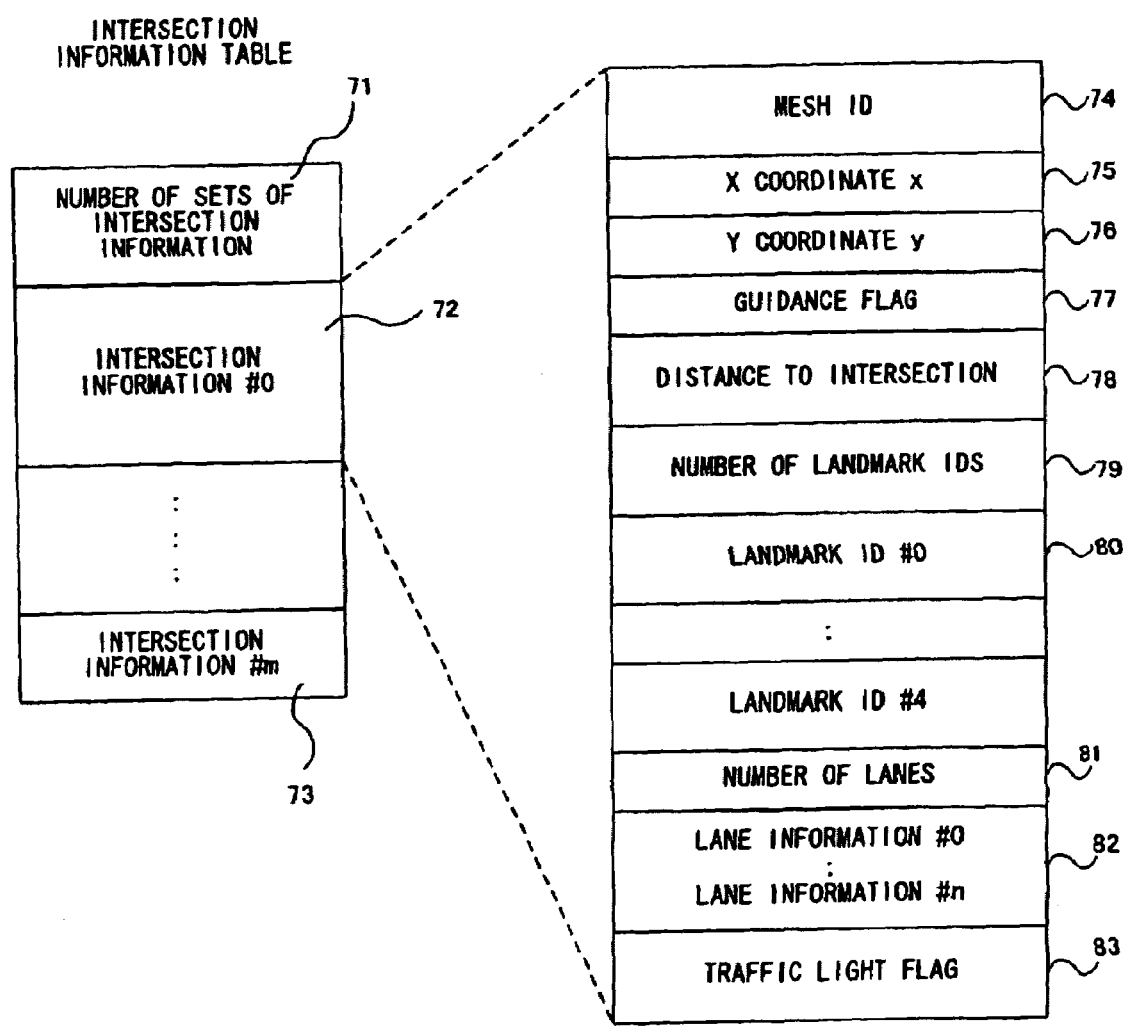
FIG. 7 shows the structure of the intersection information table.

FIG. 7 shows the structure of the intersection information table referenced in step S2. The intersection information table contains information related to up to 10 intersections present within a predetermined distance (20 km in the embodiment) from the current vehicle position on the route compiled as a table. The intersection information table, which is prepared in the memory 15 by the control device 7 by referencing the current vehicle position, the results of a route search and the guidance data, is updated every second, for instance. All the guidance-requiring intersections and non-guidance intersections with lane information are extracted. Non-guidance intersections with no lane information are not extracted. By using the intersection information table prepared as described above, various types of processing can be executed faster. The predetermined distance and the maximum number of intersections the information on which is contained in the table may be values other than those in the description above.

The intersection information table is constituted with the number 71 of sets of intersection information and intersection information #0 (72) through intersection information #m (73). As the number of sets of intersection information, the number of sets of intersection information (the number of intersections) contained in the intersection information table is stored, and each set of intersection information contains various types of information as explained below. The individual sets of intersection information each include a mesh ID 74, an X coordinate 75, a Y coordinate 76, a guidance flag 77, a distance to the intersection 78, the number of landmark IDs 79, landmark IDs 80, the number of lanes 81, lane information 82 and a traffic light flag 83.

As the mesh ID 74, the mesh ID of the mesh in which the corresponding intersection is located is stored. The mesh ID refers to an ID assigned to specify a given mesh in map data which are managed by splitting the map into a plurality of meshed areas. The X coordinate 75 and the Y coordinate 76 indicate the positional coordinates of the intersection within the mesh. The guidance flag 77 is an identification flag used to ascertain whether the intersection is a guidance-requiring intersection or a non-guidance intersection, and a TRUE value is set if the intersection is a guidance-requiring intersection, whereas a FALSE value is set for the identification flag if the intersection is a non-guidance intersection. The distance 78 to the intersection indicates the distance from the current vehicle position to the intersection on the route. The number of landmark IDs 79 is set at an appropriate value if there is any landmark located at the intersection. A landmark may be any feature on the route that can be referred to when providing guidance, such as a famous building, a convenience store, a gas station or a restaurant. A landmark ID is assigned to be used when referencing landmark display data in order to display the corresponding landmark.

The lane information used for the lane display, too, is stored in the intersection information table. In this embodiment, the lane information is stored in the guidance data and is thus extracted from the guidance data. The number of lanes 81 indicates the number of lanes in which the intersection can be approached, and the lane information 82 is information on the individual lanes. The lane information on each lane includes information indicating whether or not a vehicle in the lane is allowed to move straight forward, whether or not the vehicle is allowed to make a right turn, whether or not the vehicle is allowed to make a left turn, whether or not the lane is an additional lane and the like. The term "additional lane" refers to a lane such as a right turn only lane added on near the intersection. If 0 is set for the number of lanes 81, no lane information is available with regard to the intersection. The lane displays 33, 34 and 59 can be provided by using such lane information. The traffic light flag 83 is an identification flag used to determine whether or not there are any traffic lights operating at the intersection, and a TRUE value is set if there are traffic lights at the intersection, whereas a FALSE value is set if there are no traffic lights.

To continue with the explanation in reference to the flowchart presented in FIG. 6, a decision is made in step S2 as to whether or not there is any intersection with lane information within the 500 m range from the current position by referencing the distance 78 to, and the number of lanes 81 at each intersection in the intersection information table. If it is decided in step S2 that there is such an intersection within the 500 m range, the operation proceeds to step S3 to make a decision as to whether or not there are two or more intersections with lane information within the 500 m range since up to two lane indicators can be displayed in the embodiment.

If it is decided in step S3 that there are two or more intersections with lane information, the operation proceeds to step S4. In step S4, a lane indicator for the first intersection is brought up on display on the lower side. Next, in step S5, a lane indicator for the second intersection is brought up on the upper side, before the processing ends. The lane indicator on the upper side corresponds to the lane indicator 27 in FIG. 2, and the lane indicator on the lower side corresponds to the lane indicator 26 in FIG. 2. Namely, the lane indicator corresponding to the intersection closer to the current position is displayed on the lower side of the screen and the lane indicator for the further intersection is displayed on the upper side of the screen.

If it is decided in step S3 that the number of intersections with lane information within the 500 m range is not two or more, i.e., if it is decided that there is only one intersection within the range, the operation proceeds to step S6. In step S6, the lane indicator for the single intersection is displayed on the upper side. Next, in step S7, the lane indicator on the lower side is cleared before the processing ends. If no lane indicator has been on display on the lower side, the processing simply ends. If it is decided in step S2 that there is no intersection with lane information within the 500 m range from the current position, the operation proceeds to step S8. In step S8, any lane indicator having been up on display is cleared and then the processing ends.

Through the control explained above, lane indicators are displayed as have been explained in reference to FIG. 2.

Figure 8:
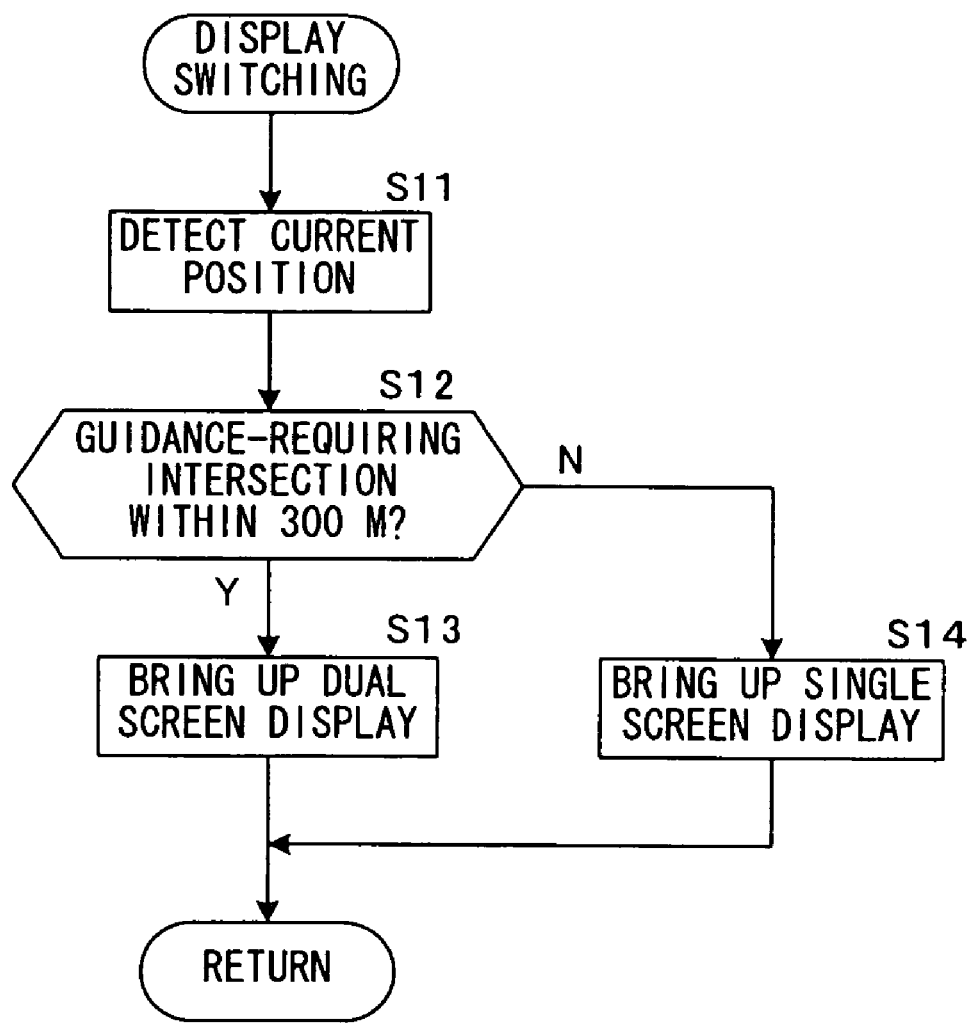
FIG. 8 presents a control flowchart of the control implemented to determine whether the single screen display or the dual screen display is to be brought up.

FIG. 8 presents a control flowchart of the control implemented to determine whether to bring up the single screen display in FIG. 2 or the dual screen display in FIG. 3.

In step S11, the current position of the vehicle is detected with the current position detection device 13. In step S12, a decision is made by referencing the intersection information table (see FIG. 7) as to whether or not there is any guidance-requiring intersection within a 300 m range from the current position. This decision is made by referencing the distance 78 to, and the guidance flag 77 corresponding to each intersection in the intersection information table. If it is decided in step S12 that there is a guidance-requiring intersection within the 300 m range, the operation proceeds to step S13. In step S13, a setting for bringing up the dual screen display shown in FIG. 3 is selected. If, on the other hand, it is decided in step S12 that there is no guidance-requiring intersection with in the 300 m range, the operation proceeds to step S14. In step S14, a setting for bringing up the single screen display shown in FIG. 2 is selected.

The following advantages are achieved by utilizing the navigation apparatus achieved in the embodiment described above.

(1) The user is able to ascertain the lane conditions at an intersection within the predetermined range from the current position at any time, instead of being able to obtain lane information only as the vehicle approaches a guidance-requiring intersection. Namely, the user can ascertain the lane conditions at an intersection on the route regardless of whether the intersection is a guidance-requiring intersection or a non-guidance intersection.

(2) In addition, since lane information corresponding to a plurality of intersections can be displayed, the user can ascertain with ease the lane conditions at intersections lying ahead on the route. In particular, the lane conditions at an intersection beyond a guidance-requiring intersection, too, can be ascertained with ease.

(3) The lane indicators are displayed one above the other and they, too, are made to shift as the vehicle moves on. As a result, the user can easily picture how the intersections lie ahead in succession. This feature is particularly effective in a head-up map display.

(4) The color coded display of lane indicators enables the user to ascertain at a glance whether the intersection corresponding to a given lane indicator is a guidance-requiring intersection or a non-guidance intersection and whether or not there is any lane information with regard to the intersection. Even when a given intersection is a non-guidance intersection with lane information and the vehicle is allowed to drive straight ahead on any of the lanes at the intersection, the user can ascertain at a glance that the intersection is a non-guidance intersection by checking the color of the base display. In addition, since the lane in which the vehicle should travel under guidance is displayed in pink as is the guided route, the user can visually ascertain at once that the lane is the lane in which his vehicle should travel under guidance.

(5) In the planimetric map, a guide pin is displayed at an intersection for which a lane indicator is displayed. Since the guide pin and the lane indicator are made to correspond with each other, the user can ascertain at once for which intersection on the planimetric map a given lane indicator is displayed. In addition, since the guide pin color is coordinated with the lane indicator display, the correlation between the individual guide pins and the corresponding lane indicators can be ascertained with ease.

(6) By displaying guide pins in a matching color at an intersection and the corresponding lane indicator, too, it becomes possible for the user to ascertain at once the correlation between the intersection on the map and the lane indicator. In this case, the display colors used for guide pins do not need to coordinate with the color coding rules in the color chart in FIG. 5 and may instead be displayed by using a plurality of other colors. By adopting these measures, it is possible to ensure that the correlation between a given intersection on the map and the corresponding lane indicator marked with guide pins in a matching color can be ascertained at a glance even when there are intersections similar to each other, e.g., even when there are non-guidance intersections (gray) with lane information, since one of the intersections and the corresponding lane indicator are marked with guide pins displayed in a color different from the display color of the guide pins marking the other intersection and its lane indicator.

(7) Since a lane indicator includes a distance bar display, the user can visually ascertain with ease the distance to the corresponding intersection. In addition, the two distance bars displayed one above the other allow the user to ascertain with ease whether the two corresponding intersections are close to each other or located over a distance from each other.

(8) As the lane display with regard to a guidance-requiring intersection is included in the enlarged map of the intersection area, the user can ascertain the lane conditions at the guidance-requiring intersection simply by looking at the enlarged map of the intersection area.

Second Embodiment

In the navigation apparatus achieved in the second embodiment, a deformed and simplified linear route bar is displayed in addition to the display segments in FIGS. 2 and 3 displayed in the first embodiment. A block diagram of the navigation apparatus achieved in the second embodiment, which will be similar to the block diagram of the first embodiment in FIG. 1, is not provided and an explanation of the structure of the navigation apparatus in the second embodiment is omitted. Reference numerals are assigned to the individual components as shown in FIG. 1.

Figure 9:
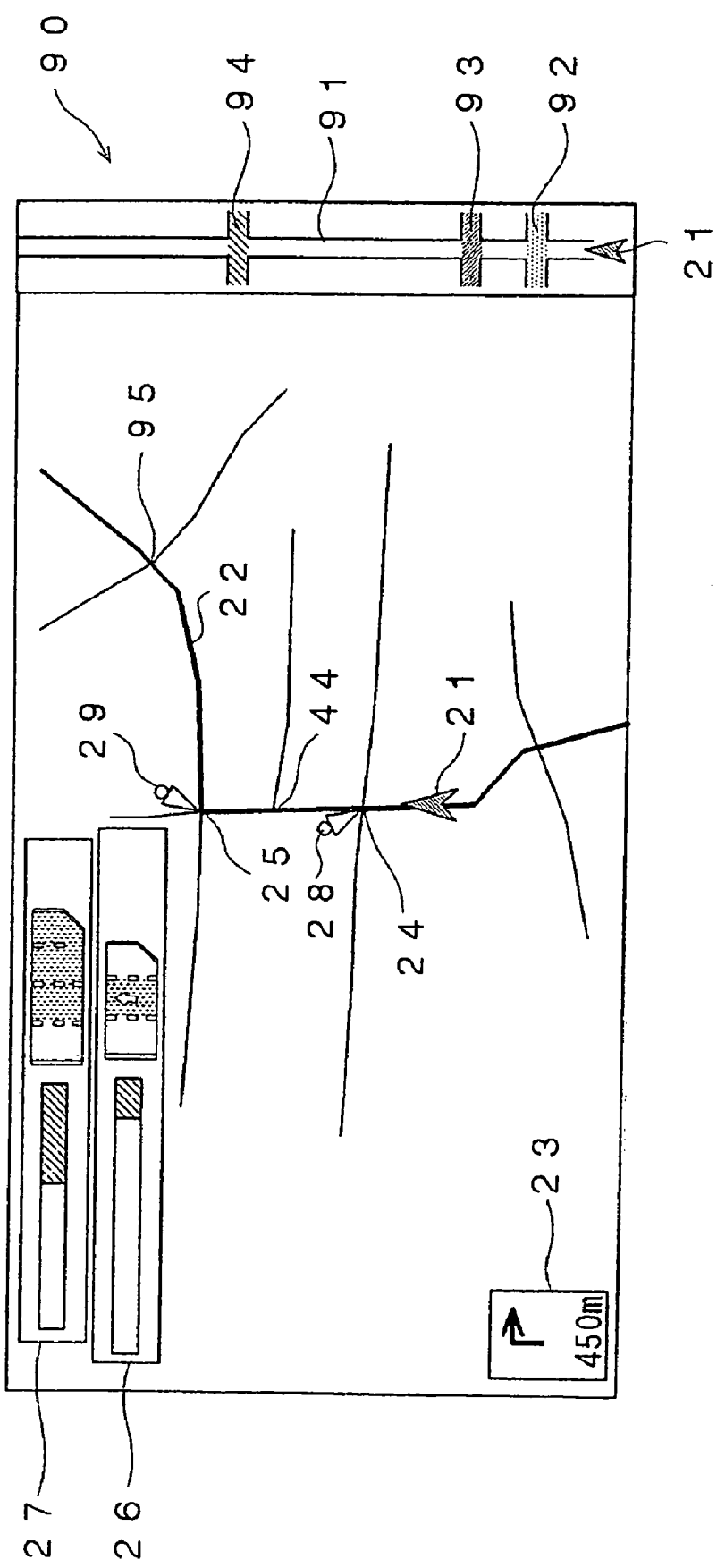
FIG. 9 shows a single screen display provided to facilitate an explanation of a lane indicator display and a route bar display.
Figure 10:
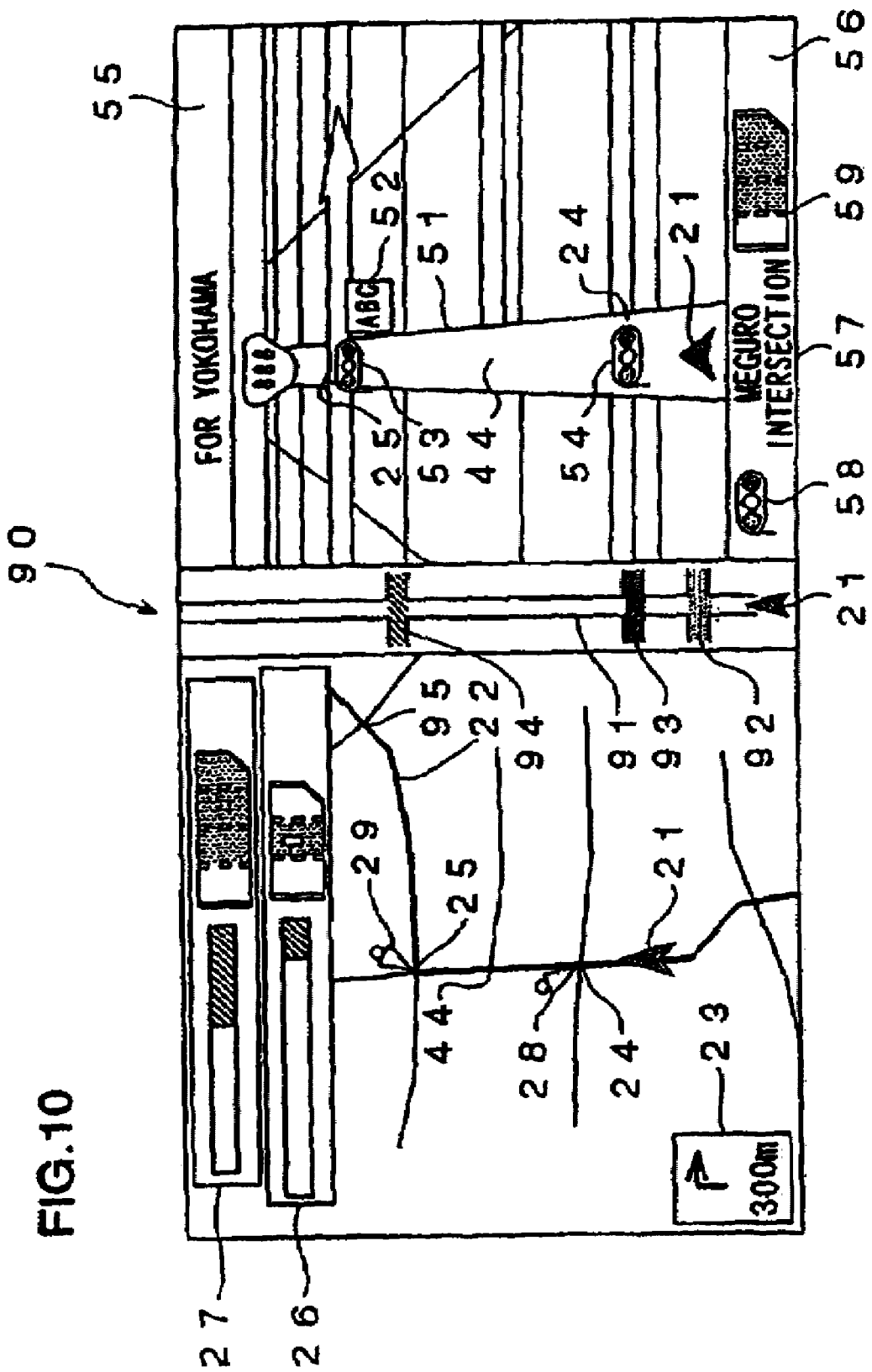
FIG. 10 shows a dual screen display provided to facilitate an explanation of a lane indicator display and a route bar display.
Figure 11:
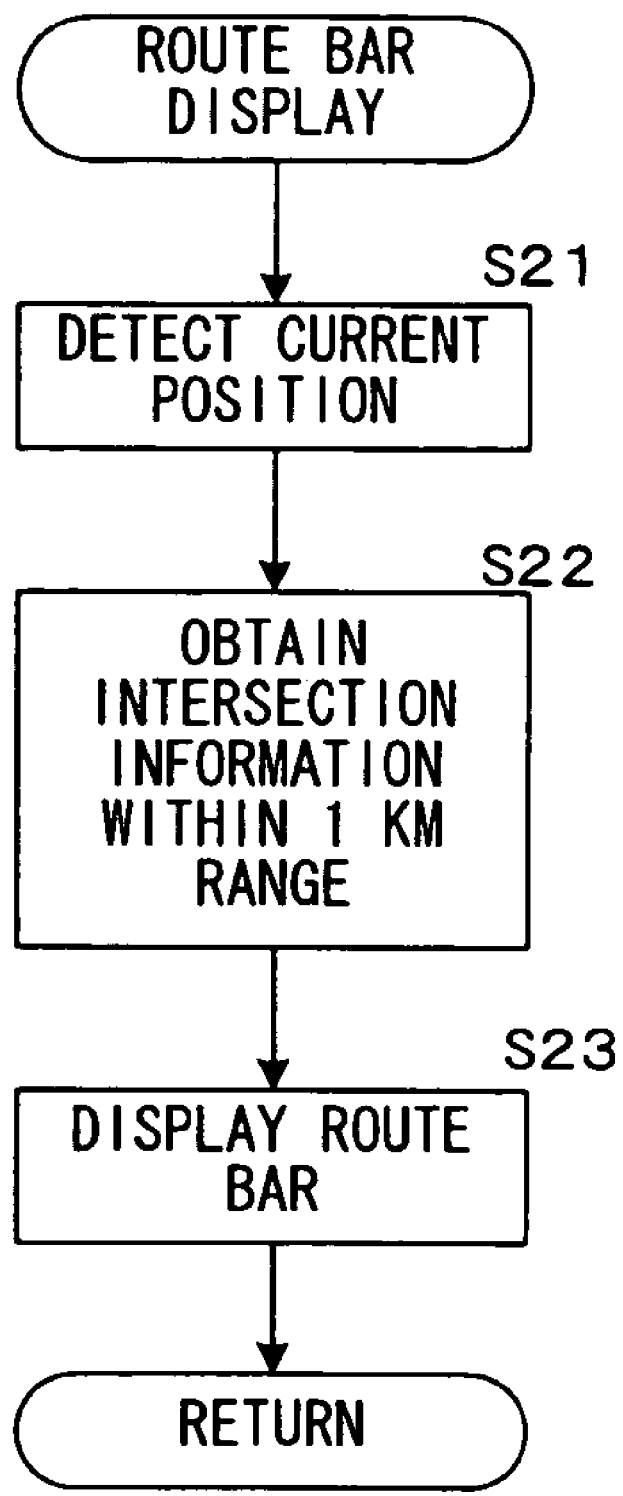
FIG. 11 presents a control flowchart of the control implemented to display the route bar.

FIGS. 9 and 10 illustrate the lane indicators and the route bar brought upon display in the second embodiment. FIG. 9 corresponds to FIG. 2 and FIG. 10 corresponds to FIG. 3, and FIGS. 9 and 10 only differ from FIGS. 2 and 3 in that they include a display of the route bar. Accordingly, the route bar is explained below by referring as necessary to the figures illustrating the first embodiment.

In the single screen display in FIG. 9, a route bar 90 is vertically displayed at the right end of the screen. In the dual screen display in FIG. 10, the route bar 90 is displayed vertically between the two sub-screens. It is to be noted that the route bar 90 may be displayed at positions other than those described above. However, it is always displayed vertically on the screen. On the route bar 90, the route over a predetermined range from the current vehicle position and intersections present within the range are displayed in a simplified form. The predetermined range maybe, for instance, 1 km. This predetermined range may be adjusted in correspondence to a specific map scaling factor, or it may be adjusted in correspondence to a setting selected by the user. In addition, it may be adjusted depending upon whether the route is on a general road or on an express highway. The range should be set to a greater value if the route is on an express highway.

In the route bar 90, a route 91, the current vehicle position 21 and intersections 92 to 94 are displayed. The route 91 is displayed as a straight rectangular block with a predetermined width by simplifying the actual route 22. The intersections 92 to 94 are each displayed as a cross point formed by the route 91 and a narrow, short rectangular block having a predetermined width which intersects the route 91 at a right angle. The route bar 90 may be regarded as a deformed and simplified display form achieved by combining rectangular blocks. In addition, even if the actual route takes a turn at a guidance-requiring intersection, the route bar is always displayed as a straight line. It is to be noted that the width of the rectangular block corresponding to the route 91 is greater than the width of the rectangular blocks ranging sideways to indicate the individual intersections 92 to 94. The intersection 92 corresponds to the intersection 24 on the map, the intersection 93 corresponds to the intersection 25 on the map and the intersection 94 corresponds to the intersection 95 on the map. The various intersections are displayed by using specific display colors, as has been described in the explanation of the first embodiment given in reference to FIG. 5. More specifically, the intersection 92 which is a non-guidance intersection with lane information is displayed in gray, the intersection 93 which is a guidance-requiring intersection with lane information is displayed in blue and the intersection 94 which is a non-guidance intersection with no lane information is displayed in pink.

The current vehicle position 21 remains unmoved on the display, and the displays of the intersections 92 to 94 move downward as the vehicle advances. The individual intersections 92 to 94 are displayed on the route bar at positions reflecting the distances from the current position 21 to the intersections. Since the intersections 92 to 94 are displayed on the route bar 90 at positions reflecting the distances from the current position 21 to the specific intersections, the user can visually ascertain the remaining distances to the individual intersections. For this reason, the route bar 90 may be regarded as a vertical remaining distance bar. In addition, if there are traffic lights at a given intersection, a traffic light mark similar to the traffic light marks 53 and 54 in FIG. 3 may be displayed at the intersection as well. FIG. 12 shows an example in which the traffic light marks are displayed in the route bar.

In the embodiment, the lane indicators 26 and 27 are color coordinated with the corresponding displays of the intersections 92 and 93 respectively so as to mark the individual correlation. A lane indicator and the corresponding intersection may be connected through an unobtrusive, thin line on the map display as well.

FIG. 1 presents a control flowchart of the control implemented to display the route bar. In step S21, the current vehicle position is detected with the current position detection device 13. In step S22, intersection information with regard to intersections present within the 1 km range from the current position is obtained by referencing the intersection information table (see FIG. 7). In step S23, intersections are displayed together with the current position 21 on the route bar 90 based upon the obtained intersection information. At this time, based upon the information which includes the guidance flag 77, the distance 78 to the intersection and the number of lanes 81 corresponding to each intersection in the intersection information table, different display colors are used to indicate specific types of intersections in conformance to the color coding rules in the color chart in FIG. 5. In addition, if the traffic light flag 83 indicates that traffic lights are operating at a given intersection, the traffic light mark is also displayed at the intersection. The position of each intersection displayed on the route bar is set in proportion to the distance 78 to the intersection on the distance bar representing a distance of 1 km.

The navigation apparatus in the second embodiment described above achieves the following advantages in addition to the advantages of the first embodiment.

(1) The user can ascertain at once how intersections lie ahead on the route by checking a simple display. For instance, the user can ascertain at a glance how many intersections lie ahead and intervals over which they are located within a specific range (1 kmin the embodiment) from the current vehicle position In addition, the user can ascertain at once whether or not each of such intersections is a guidance-requiring intersection and whether or not there is any lane information corresponding to the intersection. For instance, the user can visualize with ease at which intersection he should make a turn and the like.

(2) Since lane indicators are displayed together with the route bar display, the user having learned by checking the route bar that there is lane information with regard to a given intersection and wishing to obtain detailed lane information is able to quickly grasp detailed lane information with regard to the intersection.

(3) Since the route bar is displayed together with the map, the user can obtain necessary information on individual intersections on the route by quickly checking the route bar and then can visualize the overall route on the map by checking the map display on the same screen.

It is to be noted that while an explanation is given above in reference to the drawings on an example in which a planimetric map is displayed, the present invention is not limited to this example. For instance, a so-called bird's-eye view map instead of a planimetric map may be displayed. A bird's-eye view map is obtained by looking down on a planimetric map at a specific angle of elevation from a point set behind the current vehicle position, and may be generated by executing a specific type of coordinate conversion processing on the planimetric map data.

In addition, while the lane indicators 26 and 27 are displayed at the upper left of the screen in the embodiments described above, the present invention is not limited to this example. The lane indicators 26 and 27 may be displayed at another position, or the display position of the lane indicators 26 and 27 may be specified by the user.

Furthermore, while information on a non-guidance intersection with no lane information is not extracted to be included in the intersection information table in the embodiments described above, the present invention is not limited to this example. Information on non-guidance intersections with no lane information, too, may be extracted instead. Also, while the second embodiment is explained in reference to an example in which non-guidance intersections with no lane information are not displayed on the route bar 90, such intersections, too, maybe displayed in gray or another color instead.

While an explanation is given above in reference to the embodiments on an example in which the lane information used to compile the intersection information table is extracted from the guidance table, the present invention is not limited to this example. If the lane information is included in another type of map data, it should be extracted from those map data.

While the control program executed at the control device 11 of the navigation apparatus 1 is installed in a ROM (not shown) in the embodiments explained above, the present invention is not limited to this example. The control program and the installation program for the control program may be provided in a recording medium such as a DVD. In such a case, the DVD should be loaded into the DVD drive device 12, as is the recording medium 3 shown in FIG. 1.

Moreover, these programs may be provided via a transmission medium such as a communication line, a typical example of which is the Internet. Namely, the programs may be transmitted as signals on a carrier wave which is transmitted through a transmission medium. The navigation apparatus achieved in either of the embodiments can be connected with the communication device 2 such as a portable telephone via the communication I/F 16. Thus, a connection with the Internet 4 can be achieved via the portable telephone 2. Then, the navigation apparatus can ultimately be connected with a server that provides the control program via the internet 4. Thus, the control program can be distributed as a computer-readable computer program product adopting any of various modes including a recording medium and a carrier wave.

In addition, the navigation apparatus may be realized by executing the control program described above on a personal computer.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The navigation apparatuses in the above embodiments achieve the following advantages. The user can quickly ascertain the conditions at intersections on the route by checking a simple display. For instance, the user can ascertain at a glance how many intersections lie ahead within a predetermined range from the current vehicle position and the intervals over which the individual intersections are located. In addition, the user can ascertain at a glance whether or not each of the intersections of guidance-requiring intersection and whether or not there is lane information with regard to the intersection.

The above described embodiments are examples, and various modifications can be made without departing from the spirit and scope of the invention.

What is claimed is:

1. A navigation apparatus comprising:
    a route search unit that obtains a route to take from a start point to a destination;
    a vehicle position detection unit that detects a vehicle position; and
    a route guidance unit that provides route guidance based upon the obtained route, wherein:
    the route guidance unit displays the route within a predetermined range from the vehicle position as a straight bar different from a roadmap together with the vehicle position, displays an intersection indicator on the straight bar in correspondence to an intersection present within the predetermined range on the route and varies display mode when displaying the intersection indicator depending upon whether the intersection is a guidance-requiring intersection at which the route guidance is provided or a non-guidance intersection at which the route guidance is not provided.

2. A navigation apparatus according to claim 1, wherein:
    the route guidance unit displays the intersection indicator so as to enable a user to determine whether or not traffic lights are present at the intersection.

3. A navigation apparatus according to claim 1, wherein:
the route guidance unit displays the vehicle position on the straight bar at a fixed position and shifts the intersection indicator as the vehicle moves.

4. A navigation apparatus according to claim 1, wherein:
the route guidance unit varies the display mode by changing a color used to display the intersection indicator.

5. A navigation apparatus according to claim 1, wherein:
the route guidance unit displays the intersection indicator on the straight bar at a position set in proportion to a distance from the vehicle position to the intersection.

6. A navigation apparatus according to claim 1, wherein:
the route guidance unit displays information related to lane corresponding to the intersection.

7. A navigation apparatus according to claim 6, wherein:
the route guidance unit displays the intersection indicator on the straight bar and the information related to lane with specific correlated indication regarding an intersection.

8. A navigation apparatus according to claim 1, wherein:
the route guidance unit displays the route as the straight bar even if the route turns at an intersection.

9. A navigation apparatus according to claim 1, wherein:
the route guidance unit displays the route as the straight bar simplified differently from a road map.

10. A navigation apparatus according to claim 1, wherein:
the route guidance unit displays the route as the straight bar always vertically on a screen.

11. A navigation apparatus comprising:
a route search unit that determines a route to take from a start point to a destination;
a vehicle position detection unit that detects a vehicle position; and
a route guidance unit that provides route guidance based upon the obtained route, wherein:
the route guidance unit displays the route within a predetermined range from the vehicle position as a straight bar together with the vehicle position, displays an intersection indicator on the straight bar in correspondence to an intersection present within the predetermined range on the route and varies display mode when displaying the intersection indicator depending upon whether or not there is lane information to be guided at the intersection.

12. A navigation apparatus according to claim 11, wherein:
the route guidance unit displays the intersection indicator so as to enable a user to determine whether or not traffic lights are present at the intersection.

13. A navigation apparatus according to claim 11, wherein:
the route guidance unit displays the vehicle position on the straight bar at a fixed position and shifts the intersection indicator as the vehicle moves.

14. A navigation apparatus according to claim 11, wherein:
the route guidance unit varies the display mode by changing a color used to display the intersection indicator.

15. A navigation apparatus according to claim 11, wherein:
the route guidance unit displays the intersection indicator on the straight bar at a position set in proportion to a distance from the vehicle position to the intersection.

16. A navigation apparatus according to claim 11, wherein:
the route guidance unit displays information related to lane corresponding to the intersection.

17. A navigation apparatus according to claim 16, wherein:
the route guidance unit displays the intersection indicator on the straight bar and the information related to lane with specific correlated indication regarding an intersection.

18. A computer product comprising a computer-readable medium having stored thereon a control program that executes functions of:
obtaining a route to take from a start point to a destination;
detecting a vehicle position;
providing route guidance based upon the obtained route;
displaying the route within a predetermined range from the vehicle position as a straight bar different from a roadmap together with the vehicle position;
displaying an intersection indicator on the straight bar in correspondence to an intersection present within the predetermined range on the route; and
varying a display mode when displaying the intersection indicator depending upon whether the intersection is a guidance-requiring intersection at which the route guidance is provided or a non-guidance intersection at which the route guidance is not provided.

19. A computer product comprising a computer-readable medium having stored thereon a control program that executes functions of:
determining a route to take from a start point to a destination;
detecting a vehicle position;
providing route guidance based upon the determined route;
displaying the route within a predetermined range from the vehicle position as a straight bar together with the vehicle position;
displaying an intersection indicator on the straight bar in correspondence to an intersection present within the predetermined range on the route; and
varying a display mode when displaying the intersection indicator depending upon whether or not there is lane information to be guided at the intersection.

* * * * *